United States Patent [19]

Illgen

[11] 4,266,347
[45] May 12, 1981

[54] HOLDER FOR A PLUMB BOB

[76] Inventor: Lester Illgen, Rte. 2 - Box 34, Lockport, Ill. 60441

[21] Appl. No.: 73,403

[22] Filed: Sep. 7, 1979

[51] Int. Cl.³ .............................................. G01C 15/10
[52] U.S. Cl. ...................................................... 33/393
[58] Field of Search ................ 242/85.1; 33/392, 393, 33/413

[56] References Cited

U.S. PATENT DOCUMENTS

| | | | |
|---|---|---|---|
| 642,888 | 2/1900 | Van Vliet | 33/393 |
| 1,098,033 | 5/1914 | Friendship | 33/413 |
| 1,305,486 | 6/1919 | Orman | 248/112 |
| 2,135,211 | 11/1938 | Johnson | 33/393 X |
| 2,492,609 | 12/1949 | Worden | 33/393 |
| 2,637,913 | 5/1953 | Williams | 33/393 |
| 3,442,025 | 5/1969 | Mathiesen | 33/393 |
| 3,568,322 | 3/1971 | Showers | 33/393 |

*Primary Examiner*—Harry N. Haroian
*Attorney, Agent, or Firm*—Ernest S. Kettelson

[57] ABSTRACT

A holder for a plumb bob, comprising a frame formed from a continuous length of relatively stiff but bendable wire to provide a spool portion for the plumb bob cord, and a storage rack to hold the plumb bob. A cord playout stop member is included to anchor and hold a portion of the cord against further unwinding after a desired length has been unwound from the spool.

10 Claims, 4 Drawing Figures

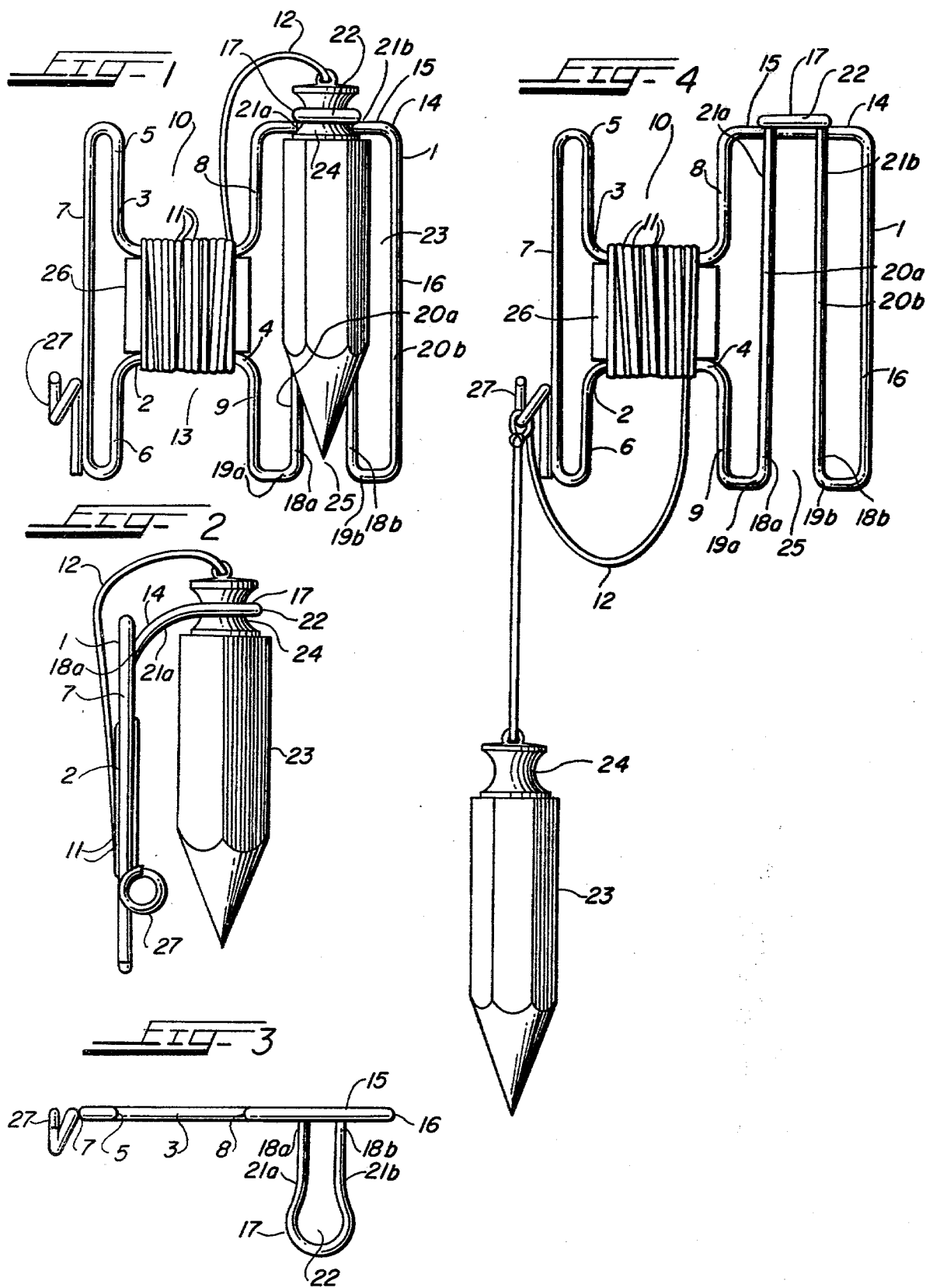

HOLDER FOR A PLUMB BOB

BACKGROUND OF THE INVENTION

This invention relates to the field of plumb bobs used for surveying, levelling and other purposes requiring a plumb line, and in particular to holders for plumb bobs.

A number of reels and carriers for plumb bobs are known to the prior art, most of which are relatively complex and include moving parts such as a rotatable reel, or which include an enclosure of some kind. Such features add to the expense, and moving parts inevitably wear out or are subject to damage as are enclosure devices which render them unusable.

The present invention overcomes such problems by providing a sturdy spool and storage rack made from a single continuous length of wire or other material. The cord can easily be unwound from the spool and rewound thereon without the use of any moving parts, and the plumb bob can easily be placed in the storage rack and readily removed therefrom without the need for an enclosure of any kind.

SUMMARY OF THE INVENTION

It is an object of the invention to provide a plumb bob holder comprising a frame formed from a continuous length of material to provide a spool for a plumb bob cord and a storage rack for an attached plumb bob.

It is an object of the invention to provide a plumb bob holder of relatively inexpensive but durable construction on which the plumb bob cord may be neatly wound and on which the plumb bob may be securely held.

It is an object of the invention to provide a plumb bob holder requiring no moving parts nor an enclosure, having a spool for the plumb bob cord, a storage rack for the plumb bob, and a cord stop member to hold the spool of cord against further unwinding after a desired portion has been unwound from the spool.

BRIEF DESCRIPTION OF THE DRAWING

FIG. 1 is a front elevation view of a holder for a plumb bob in accordance with this invention.

FIG. 2 is a side elevation view of the holder for a plumb bob of FIG. 1.

FIG. 3 is an end elevation view from the upper end of the holder for a plumb bob of FIG. 1, with the plumb bob and cord removed.

FIG. 4 is a front elevation view of the holder for a plumb bob of FIG. 1 showing the plumb bob removed from the storage rack suspended on the cord, and the cord anchored to the stop member.

DESCRIPTION OF PREFERRED EMBODIMENT

A plumb bob holder in accordance with this invention includes a frame 1 which may be formed from a single continuous length of relatively stiff but bendable wire.

A spool section 2 is formed by a pair of spaced apart cross-arms 3 and 4 extending at substantially right angles from integrally joined respective return arms 5 and 6 which in turn are integrally joined at one end to opposite ends of an elongated spool side arm 7 which runs substantially parallel to return arms 5 and 6.

The other end of the cross-arms 3 and 4 are integrally joined to respective short side arms 8 and 9 at substantially right angles, the short upper and lower side arms 8 and 9, respectively, extending outwardly from their respective cross-arms 3 and 4.

The return arm 5 is substantially the same length as short upper side arm 8 and each provides an opposite retaining surface bounding a first spool cavity 10 therebetween to retain the upper portion of wound coils 11 of the string or cord 12 when wound on the cross-arms 3 and 4 of the spool section 2.

The return arm 6 is substantially the same length as short lower side arm 9 and each provides an opposite retaining surface bounding a second spool cavity 13 therebetween to retain the lower portion of wound coils 11 of the string or cord 12 when wound on the cross-arms 3 and 4 of the spool section 2.

A storage rack section 4 is formed by a transverse upper cross-arm 15 integrally joined to short upper side arm 8 at a substantially right angle, and elongated rack side arm 16 integrally joined at a substantially right angle to upper cross-arm 15, and an arcuate storage rack 17 comprising a pair of elongated and arcuate spaced apart rails 18a and 18b which are integrally joined at respective first ends 19a and 19b to short lower side arm 9 in the case of rail 18a and to elongated rack side arm 16 in the case of rail 18b.

The rails 18a and 18b of storage rack 17 include a first elongated rectilinear portion 20a and 20b which extends upwardly from first ends 19a and 19b to approximately the level of upper cross-arm 3 of spool section 2 or above, and a second arcuate portion 21a and 21b integrally joined to respective rectilinear portions 20a and 20b. The spool cross-arms 3 and 4, the return arms 5 and 6, the spool side arm 7, the upper and lower side arms 8 and 9 of spool section 2, the transverse upper cross arm 15 of rack section 14, the rack side arm 16 and the rectilinear portions 20a and 20b of storage rack rails 18a and 18b all lie in substantially the same plane, and are sometimes referred to herein as the planar portions. The arcuate portions 21a and 21b of the rails 18a and 18b curve outwardly and upwardly from the respective rectilinear portions 20a and 20b and terminate at a closed loop end 22.

The arcuate portions 21a and 21b of rails 18a and 18b curve outwardly a sufficient distance so the plumb bob 23 is spaced from the planar portions of the frame 1 when the neck 24 of the plumb bob 23 is seated in the closed loop end 22 of the storage rack 17.

The rails 18a and 18b of storage rack 17 are spaced apart a distance which is slightly less than the diameter of the smallest cross sectional dimension of the neck 24 of plumb bob 23. The rails 18a and 18b are resilient enough by virtue of their connections at ends 19a and 19b to respective connective portions 9 and 16 respectively of the frame 1 to spread apart slightly under tension when the neck 24 of plumb bob 23 is placed between the rails 18a and 18b and moved from the entrance 25 of storage rack 17 to the closed loop end 22 thereof. The closed loop end 22 is of slightly larger diameter than the smallest cross sectional dimension of neck 24, whereby when it reaches closed loop end 22 and becomes seated therein the slightly resilient rails 18a and 18b spring back to their original spaced apart positions which is spaced apart distance of slightly less than the said diameter of neck 24 of plumb bob 23. The effect is to lock the neck 24 of plumb bob 23 in the closed loop end 22 and thus prevent unintended separation or removal of the plumb bob 23 from the storage rack 17. It is held securely in place until it is desired to remove the plumb bob 23 for use.

A planar stiffening plate 26 is provided between cross-arms 3 and 4 of the spool section 2 to increase the rigidity and dimensional stability of the spool section 2 when the cord 12 is coiled there-around. The plate may be soldered or welded in place.

A cord anchor or stop member 27 is welded, soldered or otherwise secured to the lower portion of the elongated side arm 7, comprising a loop or wire turn around which a portion of the cord 12 may be looped or tied after a given length has been unwound from the spool 2 to prevent further unwinding and to anchor the cord for suspending the plumb bob therefrom to provide a perpendicular line or plumb line, as shown in FIG. 4.

I claim:

1. A holder for a plumb bob, comprising a planar spool section on which to wind the cord of a plumb bob, said planar spool section lying in a single plane, and a rack section to receive and hold a plumb bob, said rack section including a planar portion lying in a first plane and an extending portion extending outwardly from said first plane to hold said plumb bob in spaced apart relationship with said planar portion of said rack section.

2. A holder for a plumb bob as set forth in claim 1, wherein said planar spool section and said rack section are integrally joined.

3. A holder for a plumb bob as set forth in claim 2, wherein said integrally joined planar spool section and said rack section are formed from a single length of material.

4. A holder for a plumb bob, comprising a planar spool section on which to wind the cord of a plumb bob, and a rack section to receive and hold a plumb bob, said rack section including a planar portion lying in a first plane and an extending portion extending outwardly from said first plane to hold said plumb bob in spaced apart relationship with said planar portion of said rack section, wherein said spool section includes a pair of spaced apart laterally extending cross-arms, said cross-arms being respectively connected at first ends thereof to a first longitudinally extending side arm, said cross-arms being respectively connected at their second opposite ends to said rack section.

5. A holder for a plumb bob, comprising a planar spool section on which to wind the cord of a plumb bob, and a rack section to receive and hold a plumb bob, said rack section including a planar portion lying in a first plane and an extending portion extending outwardly from said first plane to hold said plumb bob in spaced apart relationship with said planar portion of said rack section, wherein said spool section includes a pair of spaced apart laterally extending cross-arms, said cross-arms being respectively connected at first ends thereof to a first longitudinally extending side arm, said cross-arms being respectively connected at their second opposite ends to respective second and third longitudinally extending side arms which extend outwardly from said cross-arms to which each is respectively connected in opposite directions, said second and third side arms being in substantially axial alignment with each other and in substantially parallel relationship with said first side arm.

6. A holder for a plumb bob as set forth in claim 5, wherein said second and third longitudinally extending side arms are integrally connected to said rack section.

7. A holder for a plumb bob as set forth in claim 5, wherein said rack section includes a planar frame lying in said first plane, said planar frame including a fourth longitudinally extending side arm, first connecting means to connect a first end of said fourth longitudinally extending side arm to said second longitudinally extending side arm, said rack section including a storage rack member comprising a pair of spaced apart rails defining a storage rack channel therebetween open at one end and having retention means at the opposite end to hold a plumb bob therein for storage, second connecting means to connect said third longitudinally extending side arm to one of said rails and third connecting means to connect a second opposite end of said fourth longitudinally extending side arm to the other of said rails.

8. A holder for a plumb bob as set forth in claim 7, wherein said first connecting means comprisises a laterally extending cross-arm integrally connected at substantially right angles to said second longitudinally extending side arm at one end and to said fourth longitudinally extending side arm at the other end, said second connecting means comprises an integrally formed junction portion connecting said third longitudinally extending side arm to said one of said rails, said third connecting means comprises an integrally formed junction portion connecting said fourth longitudinally extending side arm to said other of said rails, said laterally extending cross-arm, said third and fourth longitudinally extending side arms and said second and third connecting means being of resilient spring material to permit said pair of spaced apart rails to be spread apart slightly under tension when inserting the neck of a plumb bob therebetween and to permit said rails to return to their original spaced apart position when said plumb bob neck has been passed through said storage rack channel.

9. A holder for a plumb bob as set forth in claim 8, wherein said spaced apart rails of said storage rack member include respective planar portions and respective arcuate portions, said planar portions of said storage rack member lying in said first plane, said arcuate portions of said storage rack member extending arcuately upward and outward from their respective planar portions to which they are integrally joined, said arcuate portions terminating in a closed loop end, said storage rack channel between said rails being spaced apart a distance which is slightly less than the diameter of the smallest cross-sectional portion of the neck of a plumb bob to be held in said storage rack member, the diameter of said closed loop end being slightly larger than said diameter of said neck portion of said plumb bob to permit said rails to return to their original spaced apart distance when said plumb bob neck has been passed therethrough to seat in said closed loop end for storage thereby locking said plumb bob in said closed loop end of said storage rack member until it is desired to remove for use.

10. A holder for a plumb bob as set forth in claim 9, including a planar stiffener plate between said spaced apart laterally extending cross-arms of said planar spool section, said planar spool section lying in said first plane, and a cord stop member on which to anchor a portion of said cord to prevent further unwinding of said cord from said spool section.

* * * * *